March 1, 1927.
J. H. HAMMOND, JR
1,619,205
ANGLE INDICATING DEVICE FOR MOVING BODIES
Original Filed Sept. 25, 1918
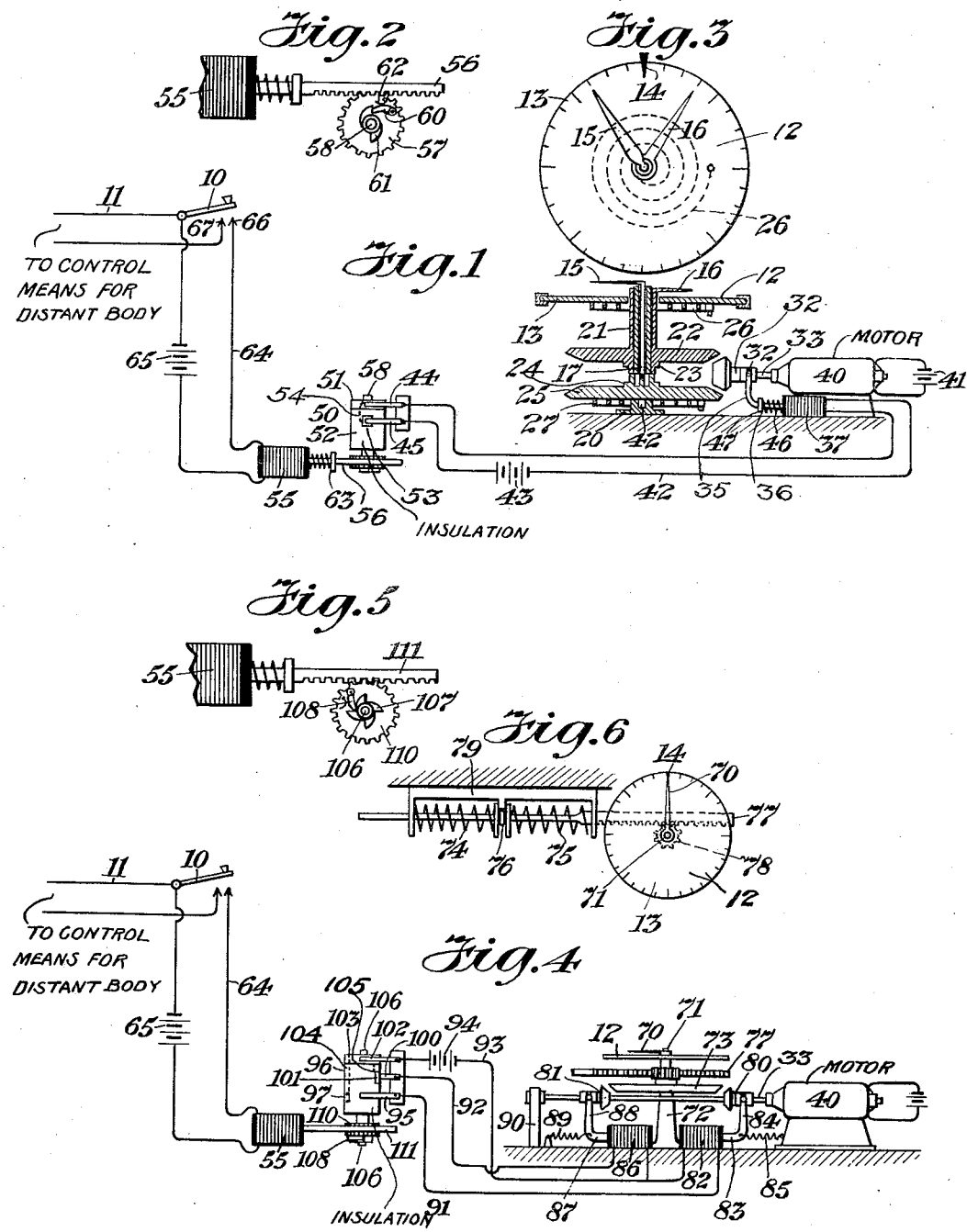
WITNESS
Chas. F. Clagett
INVENTOR
John Hays Hammond Jr.
BY
A. J. Gardner
HIS ATTORNEY Patented Mar. 1, 1927.

1,619,205

UNITED STATES PATENT OFFICE.

JOHN HAYS HAMMOND, JR., OF GLOUCESTER, MASSACHUSETTS.

ANGLE-INDICATING DEVICE FOR MOVING BODIES.

Application filed September 25, 1918, Serial No. 255,681. Renewed April 26, 1924.

Some of the objects of the present invention are to provide a means for indicating the angular turning movement of a distant moving body; to provide means operating at a distance from a moving body for synchronously indicating a turning movement of that body in either direction; to provide means for simultaneously sending impulses of energy to steer a body at a distance and to indicate to an observer at the sending station the angle through which the body has turned in response to such impulses; to provide means calibrated with respect to the length of time a body has been turning and the known turning velocity of the body for indicating at a distance the angle through which the body has turned; and to provide other improvements as will hereinafter appear.

In the accompanying drawings Figure 1 represents a side elevation of an indicating system embodying one form of the present invention; Figure 2 represents a detail of the commutator actuating mechanism; Figure 3 represents a plan of one form of indicating dial; Figure 4 represents a side elevation of another form of the invention; Figure 5 represents a detail of the commutator actuating mechanism employed with the modification of Figure 4; and Figure 6 represents a plan of another form of indicating dial.

Referring to the drawings the system of the present invention comprehends a sending station for impulses of radiant energy wherein a switch or key 10 is arranged for transmitting signals by way of a normally open circuit 11 to a distant receiving station located upon a dirigible body, such as a boat, a torpedo or other suitable body which is to be controlled as to its course or direction by impulses of radiant energy transmitted by the operation of the switch 10. These transmitted impulses serve to actuate the steering mechanism of the dirigible body to cause the latter to be directed in the desired manner and the body may therefore be maintained on a predetermined course or deflected therefrom in either direction at the will of the distant operator, as fully shown and described in Patent No. 1,295,741 granted to applicant February 25, 1919.

For the purpose of indicating the angular movement of the distant body a dial plate 12 is provided which is suitably mounted in a fixed manner in a stationary casing (not shown) of any well known form. This dial plate 12 is marked with graduations 13 representing three hundred and sixty degrees or one revolution from a zero point 14. In the present form two indicating pointers 15 and 16 are provided and arranged to travel over the face of the dial 12 in opposite directions from the zero point 14. The pointer 15 parallels the face of the dial 12 and extends laterally from a spindle 17 to which it is rigidly secured, the said spindle 17 being rotatably mounted in a pedestal bearing 20 and free to rotate in either direction. The pointer 16 also parallels the dial 12 but out of alignment with the pointer 15 and is rigidly secured to a sleeve 21 which encircles the spindle 17 and has fixed thereto a disc 22 provided with a hub or boss 23 which seats upon a similar boss 24 fixed to a second disc 25. This latter disc 25 with its boss 24 is rigidly connected to the spindle 17 and the construction is such that the two discs 22 and 25 are free to rotate independently, the former 22 turning with the pointer 16 while the latter 25 turns with the pointer 15.

For normally holding the pointers 15 and 16 respectively at the zero point 14, but on opposite sides thereof, the disc 22 is controlled by a coil spring 26 which is fast at one end to the fixed dial 12 and at the other end is fast to the sleeve 21, while the disc 25 is controlled by a coil spring 27 fast at one end to the said disc 25 and at the other end to the fixed pedestal or base 20. The two springs 26 and 27 are so coiled that the tension is in opposite directions respectively and consequently under inoperative conditions the two pointers 15 and 16 are held in zero position.

In order to rotate the two pointers 15 and 16 away from the zero point to indicate an angular deflection of the movable body from its course the two discs 22 and 25 are respectively provided with bevelled peripheries 30 and 31 each arranged to contact with a cone clutch member 32 and be frictionally driven thereby in opposite directions. The clutch member 32 is suitably keyed to a shaft 33 but has free sliding movement on the shaft, this movement being under the control of a sleeve 34 slidably mounted upon the shaft 33 and operated by a link 35 rigidly carried by a core 36 of a solenoid 37. The shaft 33 is rotated at a constant speed by a motor 40 which receives current from a suitable source 41 and this speed of rotation is definitely proportioned with respect to the turning movement of the distant movable body when travelling at a known velocity. In consequence of this predetermined relation, shifting of the clutch 32 into contact with the two discs 22 and 25, causes them to rotate respectively in opposite directions in synchronism with a turning movement of the distant movable body in either direction.

For the purpose of controlling the movement of the clutch member 32 the solenoid 37 is normally maintained energized by a circuit 42 including a battery 43 and two brush terminals 44 and 45. When the solenoid 37 is deenergized a spring 46 acting between the solenoid and a lug 47 on the core 36 causes the link 35 to shift the clutch member 32 into contact simultaneously with the two discs 22 and 25 and thus causes them to rotate as previously explained.

To control the circuit 42 a commutator 50 is employed, the same being suitably mounted for rotation and having a continuous circumferential conducting band 51, upon which the brush terminal 44 rests, and a circumferential non-conducting surface 52 having a contact 53 which is bonded to the band by a suitable conductor 54 and circumferentially aligned with the terminal 45.

Thus in normal inoperative condition the commutator 50 is positioned as shown in Figure 1 with the terminal 45 resting upon the contact 53 and the circuit is therefore closed to maintain the solenoid 37 energized and the clutch 32 held out of operative position.

For imparting step by step rotation to the commutator 50 each step giving a half turn, a solenoid 55 is provided having a core 56 in the form of a rack in mesh with a gear 57 loosely mounted upon a shaft 58 which carries the commutator 50. A pawl 60 is rigidly fixed to the gear 57 and is held in engagement with a two toothed ratchet 61 by a spring 62. The teeth of the ratchet 61 are diametrically opposed so that for each reciprocation of the core 56 the shaft 58 is given a half turn. The return movement of the core 56 takes place by the action of a spring 63 suitably coiled about and fixed to the core 56 and bearing at its free end against the solenoid 55. The solenoid 55 is in a circuit 64 including a battery 65 and a terminal 66, the other terminal being the switch 10. The switch 10 in closing the circuit 64 also closes simultaneously the distant control circuit 11 through contact with a terminal 67.

In the operation of the present form of the invention the motor 40 is rotating at a constant speed predetermined with respect to the angular velocity of the distant moving body and the clutch member 32 is held out of engagement with the discs 22 and 25 by the action of the solenoid 37, which is maintained energized by the closed circuit 42. When the switch 10 closes the circuits 11 and 64, two operations take place, one causing the movable body to turn in the direction desired and the other energizing the solenoid 55 to rotate the commutator 50, thus breaking the circuit 42 and resulting in the solenoid 37 being deenergized and the clutch being thrown into frictional engagement with the two discs 22 and 25. When this takes place the two indicating pointers 15 and 16 move simultaneously away from the zero point 14 at a speed synchronized with the turning movement of the distant moving body, so that the observer is informed exactly as to the angular deviation of the body from a former course, although that body may not be in sight. One of the indicating pointers corresponds to a movement of the body in one direction while the other corresponds to a movement in the opposite direction, so that knowing the directed movement the proper pointer may be accordingly observed. At this time the terminal 45 rests upon the insulated surface of the commutator 50, so that the circuit 42 is broken, and in consequence the pointers 15 and 16 continue to rotate until the switch 10 is operated to send a second impulse. In case the pointers 15 and 16 should rotate through a complete revolution they would abut the stop 14 and the frictional engagement of the discs 22 and 25 would allow the driving means to slip. Ordinarily the angular movement of the movable body is through a relatively small angle and when the body has reached its new course the switch 10 is closed to send a second impulse to set the steering control to maintain the body upon this new course. This second impulse causes the solenoid 55 to again rotate the commutator a half revolution to again bring the contact 53 into engagement with the terminal 45, thereby closing the circuit 42 and causing the clutch member 32 to withdraw from the discs 22 and 25. When this occurs the springs 26 and 27 return the respective pointers 15 and 16 to zero position ready for the next change of direction of the movable body.

In the form of the invention shown in Figure 4 the dial 12 is provided with a single pointer 70 rigidly secured to a spindle 71 rotatably mounted in a pedestal bearing 72 and provided with a disc 73 secured for rotation with the spindle 71.

The dial 12 is normally maintained in neutral position, that is, with the pointer 70 resting at the zero point 14, by the action of two opposed springs 74 and 75 engaging opposite sides of a lug 76 fixed to a rack bar 77 which is in mesh with a pinion 78 fast to the pointer spindle 71. A support 79 forms a shroud for the springs 74 and 75 and each abuts an end thereof so as to be placed under compression by movement of the rack bar 77 from its neutral position. This disc 73 is arranged to be rotated in either direction by two clutches 80 and 81 mounted for sliding movement upon the shaft 33 and arranged to engage opposite sides of the disc 73.

Since the shaft 33 is continuously rotating under the action of the motor 40, it is evident that the pointer 70 will be turned either clockwise or counterclockwise according to which of the friction clutches 80 or 81 is in contact with the bevelled periphery of the disc 73. The clutch member 80 is moved longitudinally of the shaft 33 in one direction by a solenoid 82 acting upon a core 83 which carries as a part thereof an arm 84 secured to the clutch member 80, and in the opposite direction by a spring 85 secured to the said arm 84 and also to a fixed part such as the base of the motor 40. The clutch member 81 is similarly actuated by a solenoid 86, core 87, arm 88 and spring 89, the last being connected to a fixed part such as the end support 90 for the shaft 33.

Under inoperative conditions the two solenoids 82 and 86 are deenergized and the springs 85 and 89 hold the respective clutch members 80 and 81 out of contact with the disc 73.

For the purpose of selectively energizing the solenoids 82 and 86 they are located in two circuits 91 and 92 respectively having a common return 93 through a battery 94. The circuit 91 includes a brush terminal 95 which closes the circuit of solenoid 82 in one position of a commutator 96 which carries a contact 97 aligned with the terminal 95, while the circuit 92 includes a brush terminal 100 which closes the circuit of solenoid 86 in another position of the commutator 96 through the action of a contact 101 aligned with the terminal 100. The common return 93 has a brush terminal 102 in contact with a continuous conducting band 103 on the commutator 96 which is electrically bonded to the contacts 97 and 101 by the respective conductors 104 and 105. The aforesaid contacts 97 and 101 are located at diametrically opposite sides of the commutator surface but staggered longitudinally of that surface so that they act alternately in closing the respective circuits which they control. The surface of the commutator 96 is of non-conducting material and consequently when the terminals 95 and 100 rest thereon no current flows in either circuit.

For actuating the commutator 96 its shaft 106 has fast thereon a four tooth ratchet 107 arranged to be driven by a spring pressed pawl 108 pivotally carried by a gear 110 which is free to turn relative to the shaft 106 upon which it is mounted. This gear 110 is in mesh with a rack 111 forming the core of the solenoid 55 in the circuit 64 heretofore described, so that each impulse transmitted by operating the switch or key 10 causes the commutator 96 to be stepped one quarter of a revolution.

In the operation of this form of the invention the commutator 96 is normally in position to break both solenoid circuits so that the clutches 80 and 81 are held disengaged from the disc 73 and the pointer 70 is in neutral position. When the key 10 is depressed to transmit an impulse the solenoid 55 is energized and rotates the commutator 96 a quarter turn thereby bringing either surface contact 97 or surface contact 101 into contact with its brush terminal to close the required circuit necessary to move the pointer 70 in the same direction as the movable body is being turned. Thus if the body is turned clockwise the contact 101 will meet the terminal 100 to close the circuit of solenoid 86 whereupon the clutch 81 is drawn into frictional engagement with the disc 73 and causes the pointer 70 to move clockwise at the same angular velocity. The movement of the pointer 70 and the movable body continues until the key 10 is again depressed, a short interval resulting in a small angular movement and a long interval in a relatively long turning movement. After one impulse has been sent out to turn the distant body, such as a torpedo, in one direction and the commutator 96 has been turned another quarter to neutral position by a short impulse it will be evident that the next surface contact on the commutator 96 is given a quarter turn will engage the brush terminal 95 and cause the solenoid 82 to be energized and the pointer 70 will then be turned counter-clockwise. Should it, however, be desired to turn the movable body again clockwise, as in the illustration above, it becomes necessary to first set the commutator 96 so that the proper surface contact is in position to give the desired result. This is done by imparting short impulses to the solenoid 55 sufficient to turn the commutator 96 to the desired set position without energizing either of the solenoids 82 or 86 sufficiently to cause the pointer 70 to be disturbed. It should be understood that the control commutator in both forms of the invention is synchronized as to position and turning movement with a similar device upon the torpedo for controlling the steering mechanism thereof and consequently the indicating mechanism correctly follows the turning movement of the movable body.

Having thus described my invention, I claim and desire to protect by Letters Patent:

1. An indicating system comprising an indicator having a pair of pointers, means for turning said pointers in opposite directions, means including a motor running at a constant speed for operating said pointer turning means at a rate corresponding to the angular velocity of a distant body, an electric circuit, and means operated by the closing of said circuit for actuating said operating means, whereby said indicator reproduces the angular turning movement of said distant body.

2. An indicating system comprising an indicator having a pair of pointers, means for simultaneously turning said pointers in opposite directions, means including a motor running at a constant speed for operating said pointer turning means at a rate corresponding to the angular velocity of a distant body, an electric circuit and means operated by the closing of said circuit for actuating said operating means, whereby said indicator reproduces the angular turning movement of said distant body.

3. An indicator system comprising an indicator having a pair of pointers, means for respectively turning said pointers in opposite directions, a motor normally disconnected from said turning means and running at a constant given speed proportioned with respect to the angular velocity of a distant moving body, means including a solenoid for causing said motor to actuate said turning means, an electric circuit, and means operated by the closing of said circuit for operating said motor actuating means, whereby said indicator pointers are simultaneously moved at a predetermined rate to reproduce the angular turning movement of a distant body.

4. An indicator system comprising an indicator having a pair of pointers, means for respectively turning said pointers in opposite directions, a motor running at a constant given speed proportioned with respect to the angular velocity of a distant moving body, a clutch connected to said motor and arranged to engage said turning means, solenoid means for actuating said clutch, a commutator, a circuit including said solenoid means and said commutator, a control electric circuit, and means operated by the closing of said control circuit for actuating said commutator, whereby said pointers are operated to reproduce the angular turning movement of a distant body.

Signed at Gloucester in the county of Essex and State of Massachusetts this ninth day of September, A. D. 1918.

JOHN HAYS HAMMOND, Jr.